(12) United States Patent
Walther et al.

(10) Patent No.: US 6,200,658 B1
(45) Date of Patent: Mar. 13, 2001

(54) METHOD OF MAKING A HOLLOW, INTERIORLY COATED GLASS BODY AND A GLASS TUBE AS A SEMI-FINISHED PRODUCT FOR FORMING THE GLASS BODY

(75) Inventors: Marten Walther, Engelstadt; Michael Spallek; Burkhardt Danielzik, both of Ingelheim; Martin Heming; Johannes Segner, both of Stromberg, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/234,168

(22) Filed: Jan. 19, 1999

(30) Foreign Application Priority Data

Jan. 20, 1998 (DE) ............................................. 198 01 861

(51) Int. Cl.$^7$ ................................................... B27N 22/00
(52) U.S. Cl. ...................... 428/34.4; 428/34.5; 428/34.6; 138/145; 138/146
(58) Field of Search ................................. 428/34.4, 34.5, 428/34.6; 135/145, 146

(56) References Cited

U.S. PATENT DOCUMENTS

| 3,314,772 | 4/1967 | Poole et al. |
| 4,882,209 | * 11/1989 | Maruyama. |
| 5,154,943 | 10/1992 | Etzkorn et al. |

FOREIGN PATENT DOCUMENTS

| 39 24 830 A1 | 2/1991 | (DE). |
| 40 08 405 C1 | 7/1991 | (DE). |
| 94 04 753 U | 7/1994 | (DE). |
| 44 38 359 A1 | 5/1996 | (DE). |
| 296 09 958 U | 10/1996 | (DE). |
| 196 29 877 C1 | 3/1997 | (DE). |

OTHER PUBLICATIONS

"Entalkalisierung Von Na2O–CAO . . . ", von Schaefer et al, Glastechn. 54(1981), Nr. 8, pp. 247–256. (No month).

"Pachaging of Sensitive Parental Drugs in Glass Containers . . . " by M. Walther, Pharmaceutical Technology Europe, May 1996, vol. 8, Nr. 5., pp. 22–27.

* cited by examiner

Primary Examiner—Timothy M. Speer
(74) Attorney, Agent, or Firm—Michael J. Striker

(57) ABSTRACT

Numerous applications for hollow glass bodies made from low melting glass material require an increase in the chemical resistance of the interior surface of the glass body. In order to avoid a disadvantageous de-alkalizing process the hollow glass body must be provided with an interior coating in a comparatively expensive prior art process. In an improved process according to the invention a glass tube acting as a semifinished product from which the hollow glass body is made is provided with an interior coating of oxide material, preferably $SiO_2$, $Al_2O_3$, $TiO_2$ or mixtures thereof, having a predetermined coating thickness according to the required chemical resistance or working conditions for forming the glass body and then the hollow glass body is made from the glass tube. The coating is advantageously provided by means of a PICVD process.

9 Claims, 1 Drawing Sheet

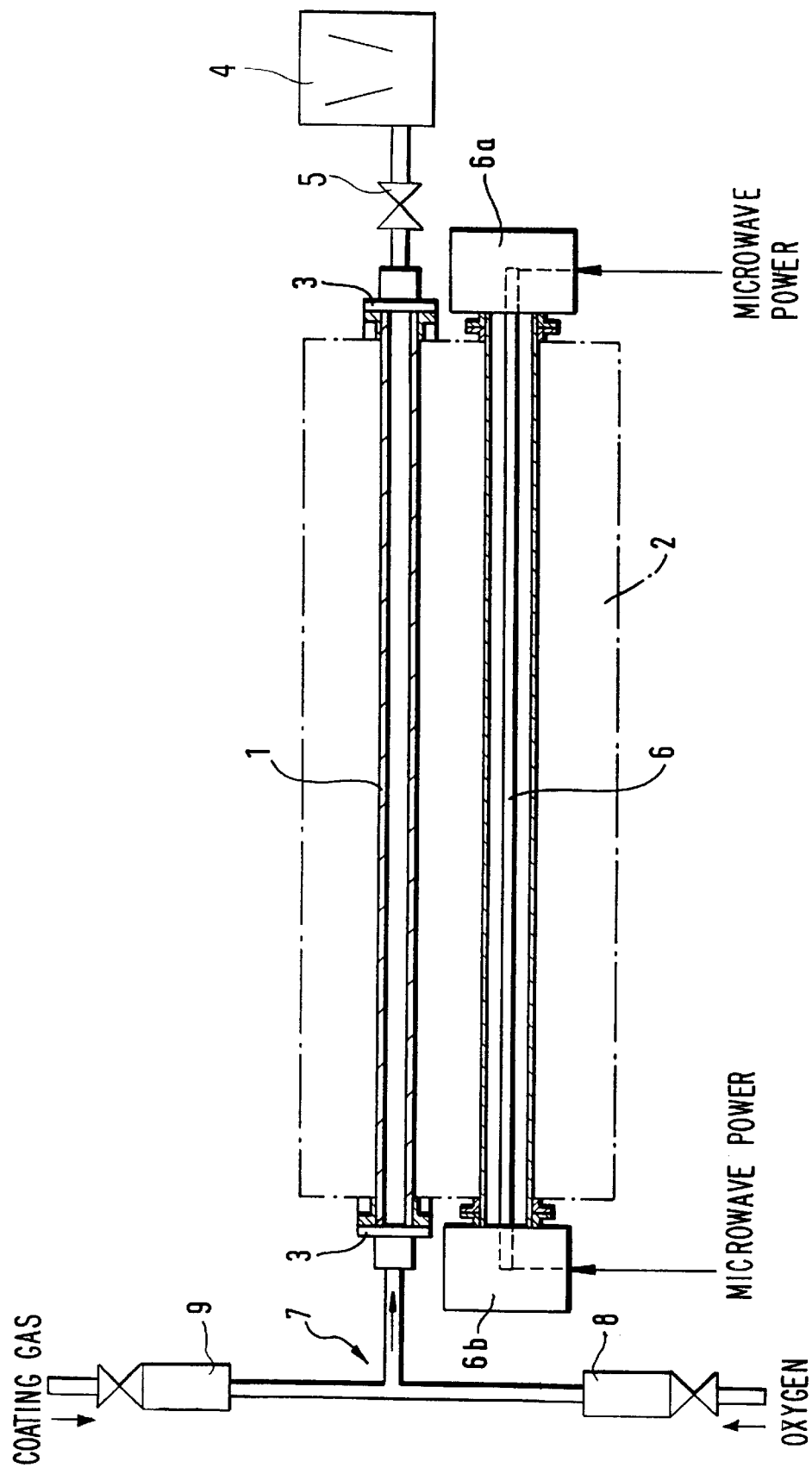

METHOD OF MAKING A HOLLOW, INTERIORLY COATED GLASS BODY AND A GLASS TUBE AS A SEMI-FINISHED PRODUCT FOR FORMING THE GLASS BODY

BACKGROUND OF THE INVENTION

1. Field of the Invention

The present invention relates to a method of making a hollow, interiorly coated glass body from a glass tube made of a low melting glass material and acting as semifinished product or intermediate product.

The invention also relates to a glass tube made from low melting glass material and acting as a semifinished product for forming a hollow glass body with an interior coating having a high chemical resistance or inertness.

2. Prior Art

Low melting glass materials, such as borosilicate glasses or calcium, sodium glasses, corrode in a known manner on contact with water or other liquids. Particularly water withdraws sodium ions from glass.

Thus it is necessary for numerous applications to increase the chemical resistance of the glass bodies, which are formed from this type of low melting glass, especially hollow glass bodies formed from glass tubes.

Hollow glass bodies, which require an increased chemical resistance for the interior surface, are, for example, those used

- for chemical plant structures,
- for flow meters for chemically reactive media,
- for analytical purposes (e.g. burette tubes, titration cylinders, etc.),
- for reagent glasses for special purposes,
- for sheathing of measuring electrodes in reactive media,
- for illumination purposes, e.g. halogen lamps,
- for discharge lamps,
- for components used for biotechnology reactors, and
- as containers for medicinal purposes (e.g. ampoules, bottles, injector devices, cylindrical ampoules, etc.).

The latter mentioned applications are of special significance.

It is indeed known to make glass tubes from silica glass (quartz glass, $SiO_2$ glass) as a semifinished product for forming hollow glass bodies, which have a very high chemical resistance. Those glass tubes are however very expensive because of the high melting point of the $SiO_2$ glass. Furthermore they can only be made with limited optical quality and are less suitable for mass production. These tubes may be formed with only very special apparatus since, on the one hand, their forming temperatures are very high and, on the other hand, the temperature interval in which their formation is possible is very small.

Semifinished glass tubes made from silica glass thus may not be of sufficient quality and are uneconomical for mass applications.

Predominantly low melting glasses, e.g. borosilicate glasses or calcium-sodium glasses, are used for large-scale glass products. These may advantageously be formed as tubes economically.

For example these glasses include the following: Duran®-borosilicate glass (Schott Glas), Fiolax®klar(Schott glass, Fiolax®braun(Schott Glas) and Kimble N 51 A (Fa. Kimble).

The compositions of these glasses made in the form of glass tubing are tabulated in the following Table I.

TABLE I

GLASS COMPOSITIONS IN % by WEIGHT*

| GLASS | $SiO_2$ | $B_2O_3$ | $Al_2O_3$ | $Na_2O$ | $K_2O$ | MgO | CaO | BaO |
|---|---|---|---|---|---|---|---|---|
| 1 | 69 | 1.0 | 4 | 12.5 | 3.5 | 2.5 | 5 | 2 |
| 2 | 69 | 1.0 | 4 | 12.5 | 3.5 | 2.5 | 5 | 2 |
| 3 | 69 | 1.0 | 4 | 12.5 | 3.5 | 2.5 | 5 | 2 |
| 4 | 70 | 1.0 | 4 | 12.5 | 3.5 | 2.5 | 5 | 2 |
| 5 | 69 | 1.0 | 4 | 12.5 | 3.5 | 2.5 | 5 | 2 |
| 6 | 69 | 1.0 | 4 | 12.5 | 3.5 | 2.5 | 5 | 2 |
| 7 | 75 | 11 | 5 | 7 | | | 1.5 | 0.5 |
| 8 | 75 | 11 | 5 | 7 | | | 1.5 | 0.5 |
| 9 | 80 | 13 | 2.5 | 3.5 | 0.5 | | | |
| 10 | 70.8 | 8 | 5.5 | 7 | 1.5 | | 1 | 2 |
| 11 | 70.8 | 8 | 5.5 | 7 | 1.5 | | 0.5 | 2 |
| 12 | 72.8 | 11 | 7 | 7 | 1 | | 1 | |
| 13 | 73.3 | 10 | 6 | 6 | 3 | | 0.5 | |
| 14 | 74.3 | 10 | 6 | 8 | 1 | | | |

*balance to 100% consists of other elements (for No. 10 and No. 11 $Fe_2O_3$ and $TiO_2$ which together are 3.5%)

It is known to increase the chemical resistance of these glass tubes made from low melting glass by a method in which the glass surface is chemically leached out. A sutable reactive gas ($SO_2$, $(NH_4)_2SO_4$ or HCl) is conducted through the still warm glass tube, which leads to a surface reaction and a reduction in the alkali content at the surface.

This type of dealkalizing process is, e.g., described in H. A. Schaeffer, et al, Glastechn. Ber. 54, Nr. 8. pp. 247 to 256. The disadvantage of this process is that predominantly toxic gasses are used, whereby the glass surface can contain traces of these reactive reaction gases after this chemical treatment and the glass surface structure is damaged which leads to an increased surface area and to an increase in reactive sites on the surface. Furthermore the use of these reactive gases is undesirable from an environmental standpoint and due to worker safety consideration. With many of the suggested gases corrosive by-products arise, which react strongly with metal apparatus parts. Furthermore particles can be released from the porous damaged surfaces during shaping or forming of this type of leached out glass tube. Also a washing process for removal of reaction products is necessary prior to use of the leached out glass tube. This washing process necessitates a drying and disposal of reaction products, i.e. the costs increase for making the semifinished glass tubes.

An additional process for dealkalizing low melting glass by fluorination by means of fluoro-acids, which has the same main disadvantages as the above-described process, is described in U.S. Pat. No. 3,314,772.

In order to avoid the disadvantages of dealkalizing process it is also known to provide a tubular glass container from low melting glass material, which operates as a packaging device for pharmaceutical materials, having a silicon dioxide ($SiO_2$) layer on its interior surface, which has the same inertness as a quartz glass surface (M. Walther, "Packaging of sensitive perenteral drugs in glass containers with a quartz-like surface", in Pharmaceutical Technology Europe, May, 1996, Vol. 8, Nr. 5, pp. 22 to 27.

The coating of the interior surface of the formed glass body occurs by chemical deposition of an oxide coating from the gas phase, especially by means of a vacuum-assisted plasma CVD process (PECVD=plasma enchanced chemical vapor deposition), in particular by means of a pulsed plasma process (PICVD=plasma impulse chemical vapor deposition).

This PECVD or PICVD method for coating of an interior of a hollow body, especially made from plastic, is known from German Patent Documents DE 196 29 877 and DE-Z "Multilayer Barrier Coating System produced by Plasma-impulse Chemical Vapor Deposition(PRCVD)" by M. Walther, M. Hemming, M. Spallek, in "Surface and Coatings Technology" 80, pp. 200 to 205 (1966).

In the known case (DE 296 09 958 U1) the finished containers, i.e. the glass bodies themselves, are interiorly coated. Because of that each glass container, must be subjected to an expensive coating process, adapted to its form.

SUMMARY OF THE INVENTION

It is an object of the present invention to provide a simple and economical method of making a hollow glass body made from a low melting glass material.

It is another object of the present invention to provide a semifinished glass tube for making the hollow, interiorly coated glass body of the invention.

These objects and others which will be made more apparent hereinafter are attain in a process of the above-described type for making a hollow, interiorly coated glass body from a glass tube made of low melting glass material and acting as a semifinished product or intermediate.

According to the invention this process includes the steps of:
- coating the interior surface of the semifinished glass tube with an oxide material to form an interior coating having a coating thickness which is adapted to the subsequent shaping or working conditions required for making the glass body and the chemical resistance requirements of the glass body, and
- making the glass body from the interiorly coated semifinished glass tube.

The glass tube according to the invention acting as the semifinished product or intermediate for making the glass body has an interior surface provided with a coating of oxide material whose coating thickness adapted to the subsequent shaping or working conditions required for making the glass body and the chemical resistance requirements of the glass body.

Glass tubes are prepared with the methods of the invention whose chemical resistance is largely maintained after a working or shaping process. These working or shaping processes can include constrictions, melting and shaping at the ends of the glass tubes, e.g. in order to be able to join them together, to connect them, to close them, etc.

The invention not only concerns the manufacture of hollow glass bodies with a high degree of shaping, i.e. the forming of such glass bodies, but also those glass bodies with a comparatively reduced degree of shaping or working, e.g. cylindrical bodies, which are made from semifinished articles by hot forming or cold forming, e.g. a drawing process, and which must be still worked only on their opposite ends. These glass bodies include, for example, an injector cylinder, e.g. according to German Patent Document DE 39 24 830 A1 or a reagent container according to German Patent Document DE 94 04 753.7 U1 or an injector cylinder open on both ends, which is closed by two stoppers and on which a needle attachment can be provided.

Because of the invention it is also possible to prepare glass tubes with increased interior chemical resistance so that the predominant part of the surface of the entire system is provided with a high chemical resistance after a possible shaping process, while a comparatively smaller area portion is left with a lesser chemical resistance. Exemplary applications include: glass tubes which are used in biotechnology and are used with media which is absorbed in standard glass surfaces, containers for medical purposes in which the total ion leach out from the container plays an important role, (e.g. for dispensing alkali and other metal ions).

When comparatively long glass tubes used as intermediate products for making the glass bodies are coated in a working process, the interiorly coated glass bodies can be made in a simple and economical manner, since the coating can be predominantly maintained after shaping. A semifinished product (or semiproduct) is a half-finished product, an article that is an intermediate between the raw material and the finished product, which however is obtained by subsequently performing different finishing steps.

Methods for interiorly coating glass tubes are known in themselves. These glass tubes are used, e.g., as pre-forms for optical fibers for transmitting light and information. Two optically different types of glass are made in the interior of a tube, which however in order to be able to be drawn out as a fiber must have very similar thermal properties (softening and shaping temperatures) and expansion coefficients.

In the known cases however glass tubes made from low melting glass material cannot act as semifinished products for forming or shaping of hollow glass bodies having an interior coating made of oxide material for increasing the chemical resistance of the glass interior surface.

The coating thickness of the oxide material is adjusted to the working or shaping conditions and the chemical resistance requirements. Both these requirements interfere with each other to some extent, since a thick coating guarantees a great chemical resistance, but impairs or prevents satisfactory working or shaping. A definite specific concrete statement of the required thickness range for the coating is not possible, but instead the coating thickness must be adapted to the particular shaping or working process being performed and to the chemical resistance requirements.

A typical coating thickness range is according to a preferred embodiment of the invention in a range of from 1 nm to 500 nm or from about 1 nm to 500 nm. The coating thickness also depends on the material selected for the coating.

According to a preferred embodiment of the invention the following oxides may be used, among others, as coating materials: $SiO_2$, $Al_2O_3$, $TiO_2$ or mixtures thereof.

The following methods are especially preferred for coating the interior surface of semifinished glass pipe.
- Methods for coating from the liquid phase (Sol Gel coating), for example, are described in H. Bach, D. Krause, "Thin Films on Glass", Springer Verlag, Berlin (1997).
- Methods are known for precipitation from supersaturated solutions.
- Sputtering methods, even when their use for pipe-like substrates is complicated, can be used, since sputtering process are direct processes.
- Advantageously CVD processes (CVD=chemical vapor deposition) can be used for making of the semifinished glass tube. The coating is produced at elevated temperatures (i.e. higher than room temperature) in so-called thermal CVD methods. These methods can be used directly during the manufacture of the glass tube after the known drawing process. For this purpose the coating gas is used as supporting air/blowing air. The coating gas decomposes in a predetermined temperature range in the glass tube and forms a coating on its interior tube surface. A suitable similar method can of course be employed which is independent of the manufacture of the glass tube however re-heating of the glass tube is then required. The subsequent heating can occur by different methods, e.g. direct heating, heating with a laser and so forth. It is also possible to reduce the coating temperature when light radiation is used for activation/production of the active coating conditions.

Advantageously the deposition of the oxide coating material can occur from the gas phase, from the coating gas, by means of a vacuum-assisted plasma CVD method, the so-called PECVD processes (plasma enhanced chemical vapor deposition). The PECVD process is described in various references. Diverse embodiments are used with different energy input in the low frequency range (e.g. 40 kHz), in the middle frequency range (e.g. 13.56 MHz) up to the microwave range (2.45 GHz and above). Examples are found in G. Janzen, "Plasma-technik(Plasma Engineering)", Hutig-Verlag, Heidelbery, 1992.

In a preferred embodiment which is especially advantageous a modified PECVD method, the so-called PICVD process (plasma-impulse-CVD process) is used, which provides a high uniformity for large-scale coated substrates. The PICVD technology is known in the patent literature from German Patent Document DE 40 08 405 C1 and from U.S. Pat. No. 5,154,943 and for example used for producing barrier layers on plastic containers (German Patent Document DE 44 38 359 A1). This technology uses pulsed plasmas for deposition of coatings from the respective coating gases.

BRIEF DESCRIPTION OF THE DRAWING

The objects, features and advantages of the invention will now be illustrated in more detail with the aid of the following description of the preferred embodiments, with reference to the accompanying sole figures which is a cross-sectional view through an apparatus for interior coating of a glass tube according to the method of the invention.

DESCRIPTION OF THE PREFERRED EMBODIMENTS

The coating apparatus shown in the figure operates according to the PICVD process. A glass tube section 1 made from low melting glass material, such as borosilicate or calcium-sodium glass, which is to be coated inside and which acts as a semifinished product or intermediate for making the interiorly coated, hollow glass body, is held in a container 2 in a vacuum-tight manner by means of the seals 3.

The glass tube section 1 has a length of 1500 mm and an interior diameter of 12 mm in the embodiment shown in the drawing.

The length of the glass tube section to be coated conforms to the dimensions of the available coating apparatus.

The interior of the glass tube section 1 is connected to one end of a vacuum system comprising a pump 4 and a valve 5.

A microwave supply device 6 comprising electrodes (antennas) passes through the container 2. Microwave radiation is coupled impulse-wise into both ends of the microwave supply device 6 by means of suitable microwave blocks 6a, 6b. The duration of the microwave pulse is in a range of from 0.1 to 10 ms.

The interior of the glass tube is connected at its other end with a gas supply apparatus 7. The gas, in which a plasma is ignited, typically oxygen, is conducted into the interior of the glass tube by means of this gas supply apparatus via a mass flow regulator 8. Another gas, the reaction gas, required for forming the coating, is also conducted into the interior of the glass tube by means of this glass supply apparatus via another mass flow regulator 9.

The reaction gas typically is a metal-organic reaction gas, such as siloxane, preferably hexamethyldisiloxane (HMDSO), tetramethyldisiloxane, titaniumtetraisopropoxide (TIPT) or silazane, from which the coating on the inside of the glass tube 1 is formed by selection of the suitable pulse duration. The pulse duration is an additional parameter, which also influences the composition of the deposited coating.

The coating process is controlled in a known manner by an unshown process controller.

First the entire tube system is evacuated and then the process pressure is controlled so that it is about 1 mbar. After that the oxygen is conducted into the system with flow of 135 standard cubic units. After 5 s 2.45 GHz microwave radiation at a power of 1 kW is input to both sides of the glass tube 1 by means of the electrodes of the microwave supply device. Because of that the plasma ignites inside the glass tube 1 and the glass tube is heated to a process temperature of 250° C. When this temperature is reached, a mass flow of 5 standard cubic units of reaction gas, preferably HMDSO, is supplied under control of the mass flow regulator 9, so that a gas mixture of oxygen and HMDSO is found inside the glass tube 1. Now a microwave power of 1.5 kW is coupled impulse-wise into the plasma inside the glass tube 1 by means of the electrodes 6, whereby the molecules of the reaction gas are cracked. The cracking products produced diffuse to the closest surface,—here the glass tube to be coated—and in due course form the desired coating. In the interval between pulses until the following pulse is ignited, which is in a range of from 10– to 100 ms, the consumed reaction gases are removed from the vacuum chamber by means of the vacuum stages 4,5 in the same manner as a two cycle motor and replaced by fresh reaction gas and oxygen.

In this manner a coating with the thickness of 5 nm can be deposited in 2 s.

The properties of the coating substantially depend on the parameters "pulse duration" and "reaction gas concentration". Generally harder coatings are deposited at small concentrations and with long pulses, which cause a substantial increase in inertness. At high concentrations and with short pulses, softer layers are deposited.

Basically a multilayer coating can be produced. Furthermore as soon as a sufficient layer thickness is obtained for the first layer, the reaction gas required to produce it is replaced by a reaction gas for the second layer. To produce a non-discontinuous or non-sharp transition between both layers, a mixture of both reaction gases can be conducted into the apparatus for a predetermined time interval. For a uniform transition the proportion of the first reaction gas can be gradually reduce and at the same time the proportion of the second reaction gas can be continuously increased to its nominal value.

Additionally or instead of oxygen as the plasma gas or gas for producing the plasma, other gases for producing a plasma which are known, such as argon, helium, hydrogen or nitrogen. Other gases for producing the plasma are described, e.g., in the book, "Plasma-Technik(Plasma Enginering)", by Schade, Verlag Technik (Engineering Press), GmbH, Berlin, 1990.

EXAMPLE

Four samples with coating thicknesses of 0.5 nm, 1 nm, 5 nm and 50 nm are prepared by variation of the coating time with the apparatus shown in the drawing. Ampoules are formed as glass bodies from the coated semifinished glass tubes. Both the unfinished glass tube samples and the finished ampoules, including an uncoated sample, were tested with the help of atomic absorption spectroscopy for limiting values according to ISO 4802, Part II, after autoclaving with steam.

The results for the Na leach out after one hour are shown in Table II hereinbelow, for the tubing in column 2 and for the ampoules in column 4.

Also the workability or formability of the ampoules from the crude or unfinished tube samples was evaluated qualitatively. These evaluations are also shown in Table II in column 3 for the respective coating thickness. The results show that the glass tube with a coating thickness of 50 nm is not workable or formable and the glass tube with a coating thickness of 5 nm has poor workability or formability and is unsatisfactory for making the ampoules.

TABLE II

MEASUREMENTS OF THE PROPERTIES AND WORKABILITY OF SEMIFINISHED GLASS TUBE SAMPLES AND AMPOULES MADE FROM THEM

| COATING THICKNESS | NA LEACH OUT (TUBE), PPM | WORKABILITY (TO AMPOULES) | NA-LEACH OUT (10 ML), PPM |
| --- | --- | --- | --- |
| Uncoated | 0.54 ppm | Good | 0.96 ppm |
| 0.5 nm | 0.11 ppm | Good | 0.21 ppm |
| 1 nm | 0.04 ppm | Good | 0.12 ppm |
| 5 nm | <0.01 ppm | Poor | 0.30 ppm |
| 50 nm | <0.01 ppm | Impossible | No measurement Possible |

The results in Table II shows that the blocking action of the coating increases with increasing coating thickness, but at the same time ampoules cannot be made if the coating is too thick. An optimum coating thickness with minimum sodium leach out is expected between a coating thickness of 1 nm and 5 nm with this coating system.

The disclosure in German Patent Application 198 01 861.4-45 of Jan. 20, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making a hollow, interiorly coated glass body and glass tube as semifinished product for forming the glass body, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass tube made from low melting glass material and acting as a semi-finished product or intermediate for making a hollow, interiorly coated glass body with an interior coating increasing a chemical resistance of said hollow, interiorly coated glass body, said glass body being formed by shaping or working, wherein said glass tube has an interior surface and a coating of oxide material on said interior surface, and said coating has a predetermined coating thickness, whereby required shaping or working conditions for making said glass body from said glass tube and chemical resistance requirements for said glass body are met.

2. The glass tube as defined in claim 1, wherein said coating thickness is in a range from 1 nm and 500 nm or from about 1 nm to 500 nm.

3. The glass tube as defined in claim 1, wherein said coating thickness is between about 1 to 5 nm.

4. The glass tube as defined in claim 1, wherein said oxide material comprises $SiO_2$, $Al_2O_3$, $TiO_2$ or mixtures thereof.

5. The glass tube as defined in claim 1, wherein said coating is provided on the interior surface of the glass tube by a method comprising a chemical vapor deposition process and including passing a mixture of a reaction gas and oxygen through the glass tube and forming a microwave discharge in the mixture in the glass tube, said reaction gas comprising hexamethyidisiloxane, tetramethyldisiloxane, titanium tetraisopropoxide or silazane.

6. A glass tube with an interior oxide coating, said glass tube with said interior oxide coating being made by a method comprising the steps of:

a) providing a glass tube consisting of a low melting glass material and having an interior surface; and b) coating said interior surface of said glass tube provided in step a) with an oxide selected from the group consisting of $SiO_2$, $Al_2O_3$ and $TiO_2$ or with a mixture of at least two members selected from the group consisting of $SiO_2$, $Al_2O_3$ and $TiO_2$ to form the interior oxide coating with a thickness of from about 1 nm to 500 nm;

whereby said glass tube with said interior oxide coating is an intermediate product for making a hollow, interiorly coated glass body from said glass tube by shaping or working so that said hollow, interiorly coated glass body has an increased chemical resistance.

7. The glass tube as defined in claim 6, wherein said thickness is from about 1 nm to 5 nm.

8. The glass tube as defined in claim 6, wherein said method comprises chemical vapor deposition (CVD) of said interior oxide coating on said interior surface from a gas phase by vacuum-assisted plasma enhanced chemical vapor deposition or plasma impulse chemical vapor deposition.

9. The glass tube as defined in claim 6, wherein said method comprises depositing said oxide coating from a liquid phase according to a sol-gel process or from a supersaturated solution.

* * * * *